(12) United States Patent
Luong

(10) Patent No.: US 9,077,888 B2
(45) Date of Patent: Jul. 7, 2015

(54) METHOD AND SYSTEM FOR ESTABLISHING AUTOFOCUS BASED ON PRIORITY

(75) Inventor: Francis Luong, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/339,647

(22) Filed: Dec. 29, 2011

(65) Prior Publication Data

US 2013/0169853 A1 Jul. 4, 2013

(51) Int. Cl.
| | |
|---|---|
| *H04N 5/232* | (2006.01) |
| *G06K 9/00* | (2006.01) |
| *G03B 3/10* | (2006.01) |
| *G03B 13/34* | (2006.01) |
| *H04N 101/00* | (2006.01) |

(52) U.S. Cl.
CPC ....... *H04N 5/23206* (2013.01); *H04N 5/23212* (2013.01); *H04N 5/23219* (2013.01); *H04N 2101/00* (2013.01)

(58) Field of Classification Search
CPC ........... H04N 5/23212; H04N 5/23219; G02B 7/346; G02B 7/36; G02B 7/38
USPC .................. 348/352, 345, 349; 382/117, 118; 386/241; 396/95, 121, 124
See application file for complete search history.

(56) References Cited

U.S. PATENT DOCUMENTS

| | | | | |
|---|---|---|---|---|
| 6,239,912 | B1 * | 5/2001 | Ozawa .......................... | 359/618 |
| 6,308,015 | B1 * | 10/2001 | Matsumoto ................... | 396/106 |
| 7,978,219 | B1 * | 7/2011 | Imes .......................... | 348/207.1 |
| 8,311,292 | B2 * | 11/2012 | Tian et al. ..................... | 382/118 |
| 8,571,402 | B2 * | 10/2013 | Takeuchi et al. ............... | 396/95 |
| 2003/0025796 | A1 * | 2/2003 | Yamagishi ................. | 348/207.2 |
| 2006/0140612 | A1 * | 6/2006 | Yata .............................. | 396/124 |
| 2006/0204055 | A1 * | 9/2006 | Steinberg et al. ............. | 382/118 |
| 2006/0204122 | A1 * | 9/2006 | Onozawa ...................... | 382/255 |
| 2006/0210260 | A1 * | 9/2006 | Yata .............................. | 396/147 |
| 2006/0245624 | A1 * | 11/2006 | Gallagher et al. ............. | 382/118 |
| 2008/0055457 | A1 * | 3/2008 | Nakahara ...................... | 348/335 |
| 2008/0158407 | A1 * | 7/2008 | Funamoto ..................... | 348/345 |
| 2009/0135292 | A1 * | 5/2009 | Muramatsu ................... | 348/349 |
| 2009/0232364 | A1 * | 9/2009 | Hosoi .......................... | 382/118 |
| 2009/0237554 | A1 * | 9/2009 | Kanayama .................... | 348/352 |
| 2010/0098397 | A1 * | 4/2010 | Yata .............................. | 396/124 |
| 2010/0245567 | A1 * | 9/2010 | Krahnstoever et al. ........ | 348/143 |
| 2012/0213490 | A1 * | 8/2012 | Steiner ......................... | 386/241 |

* cited by examiner

*Primary Examiner* — Sinh Tran
*Assistant Examiner* — Xi Wang

(57) ABSTRACT

An approach for enabling the autofocus feature of a camera to be directed towards priority targets within a frame is described. A camera retrieves a stored object image. An autofocus platform then compares an object viewed by the camera within a scene with the stored object image. The autofocus platform then determines a focus point within the scene based on the comparison. The image is captured by the camera using the determined focus point.

18 Claims, 13 Drawing Sheets

100

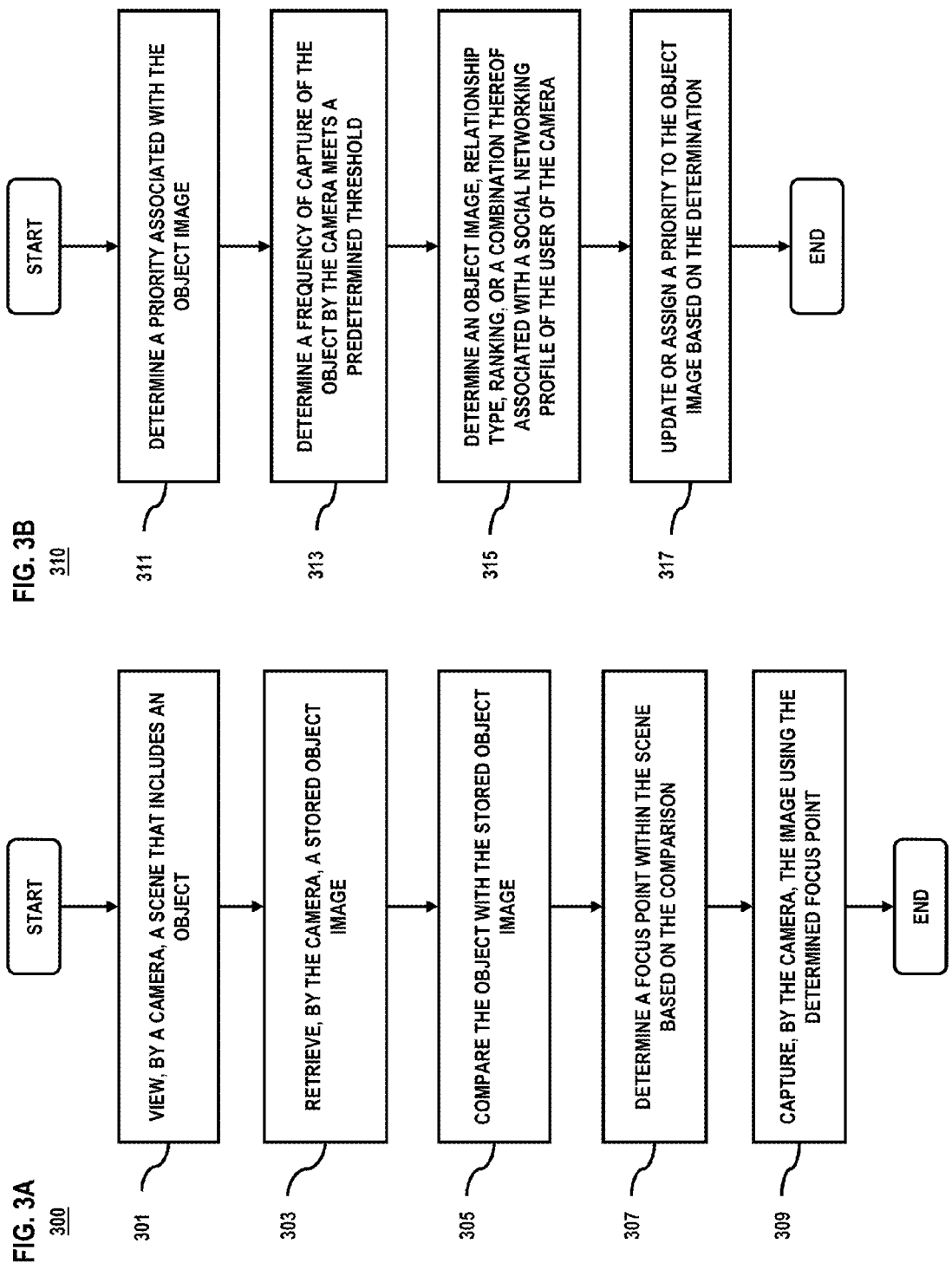

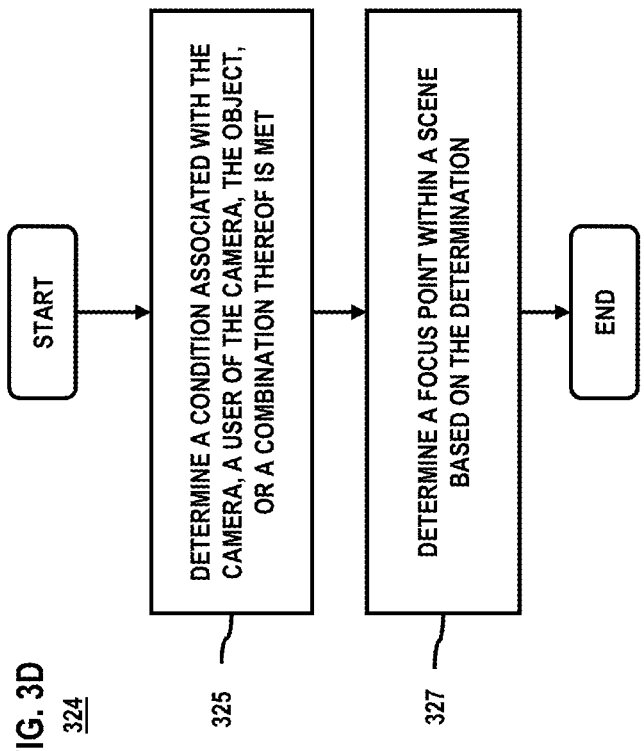
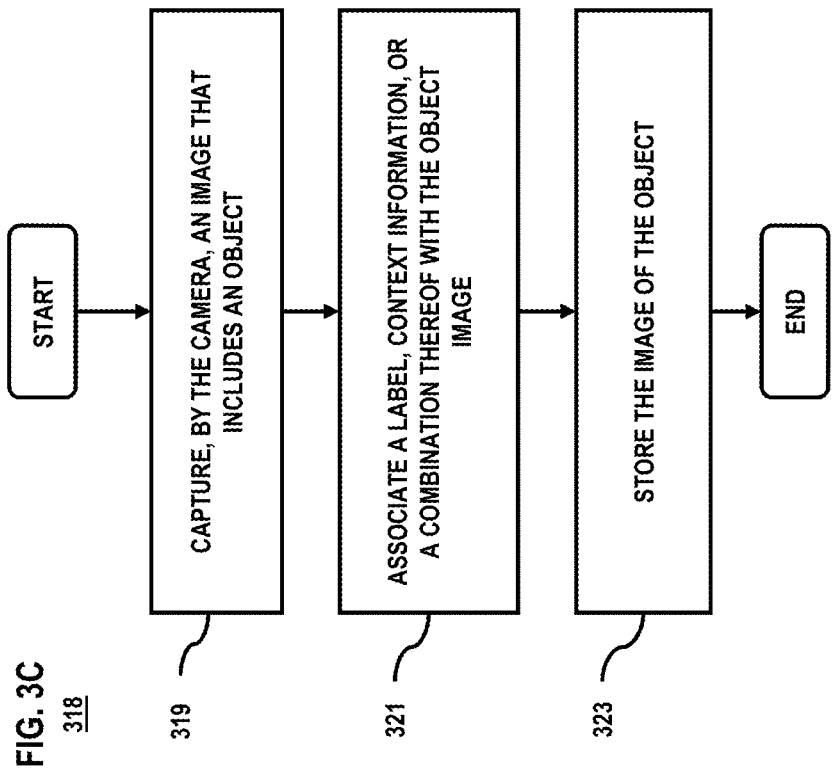

400

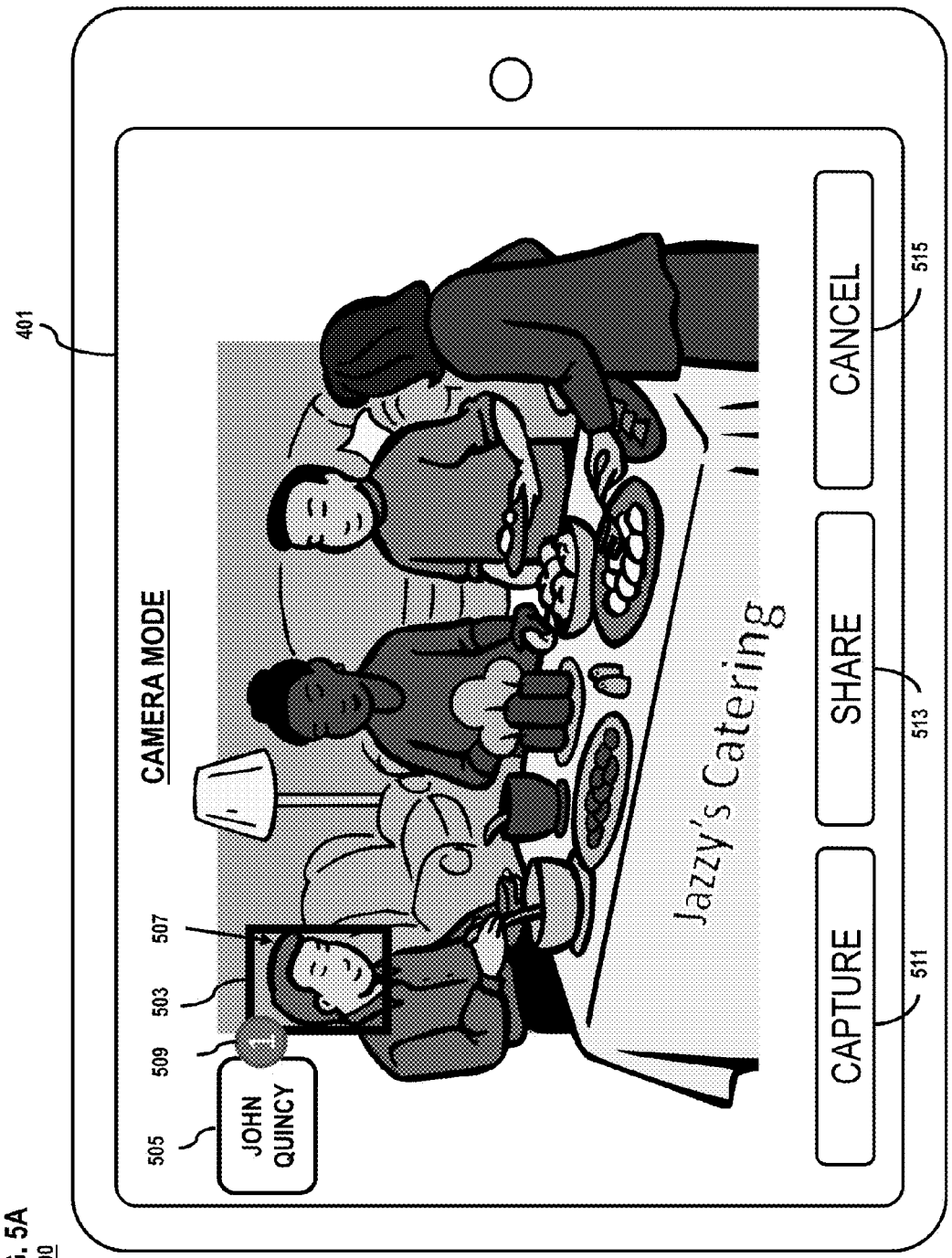

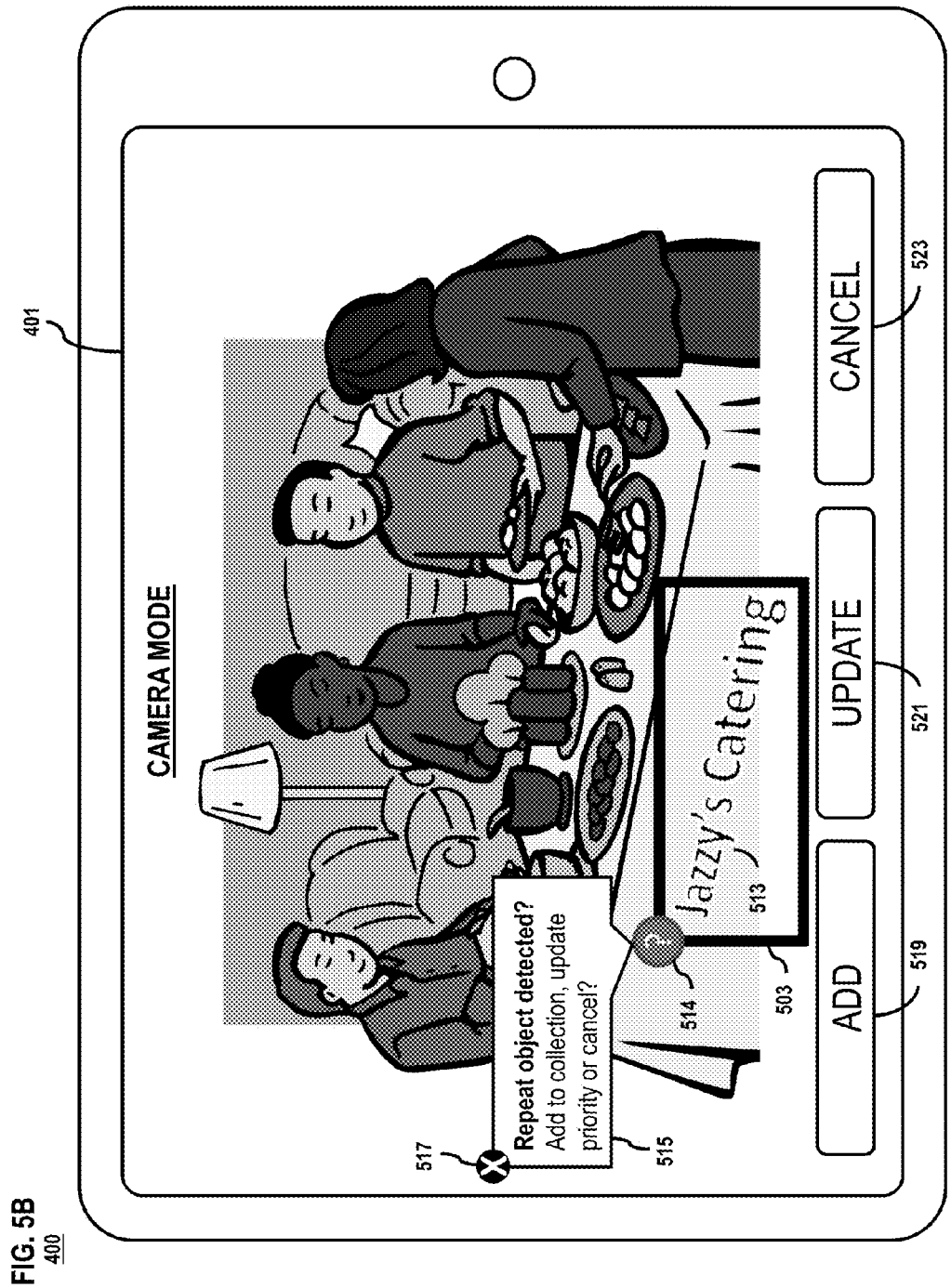

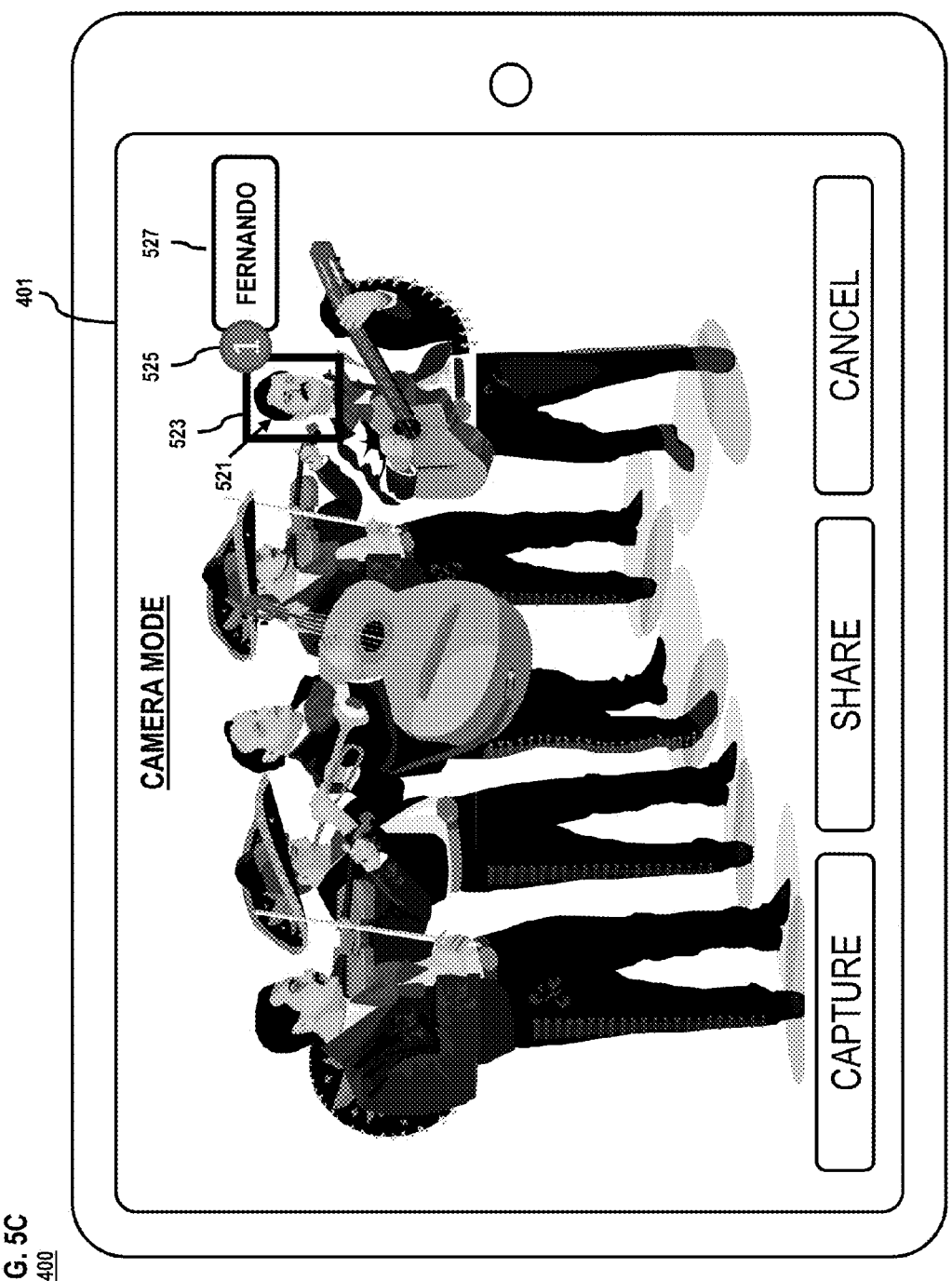

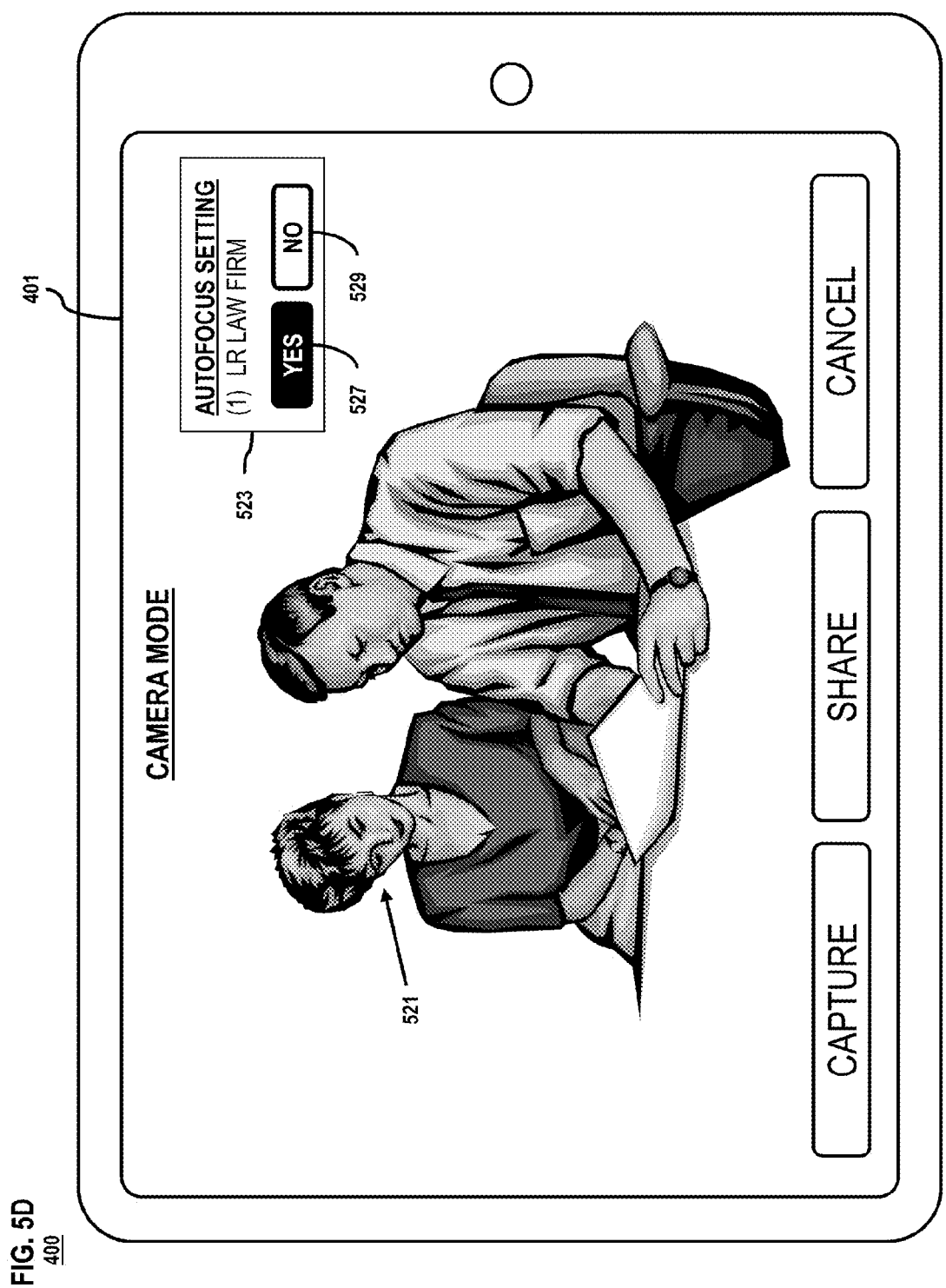

METHOD AND SYSTEM FOR ESTABLISHING AUTOFOCUS BASED ON PRIORITY

BACKGROUND INFORMATION

Service providers are continually challenged to deliver value and convenience to consumers by providing compelling network services and advancing the underlying technologies. One area of interest has been the development of services and technologies for enhancing the image capturing experience. Many cameras, smartphones and other imaging devices have an autofocus feature that enables users to select a specific point in the frame on which to focus for image capture. However, the traditional autofocus feature lack intelligence; for example, such feature cannot be trained to focus on priority targets.

Based on the foregoing, there is a need for enabling the autofocus feature of a camera to be directed towards priority targets within a frame.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of a process for enabling a customer to provision resources of a packetized voice service solution provider based on one or more conditions, according to various embodiments;

FIGS. 4A-4B and 5A-5E are diagrams of a user interface for enabling the autofocus feature of a camera to be directed towards priority targets within a frame, according to one embodiment;

DESCRIPTION OF THE PREFERRED EMBODIMENT

An apparatus, method and software for enabling the autofocus feature of a camera to be directed towards priority targets within a frame are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to facial recognition, it is contemplated that these embodiments have applicability to any data protocols, methodologies or systems for performing object or pattern recognition of any type. Also, while various exemplary embodiments are described with respect to image capture enabled devices such as smartphones and tablet computers, the exemplary embodiments have applicability to any digital camera device.

Figure 1:
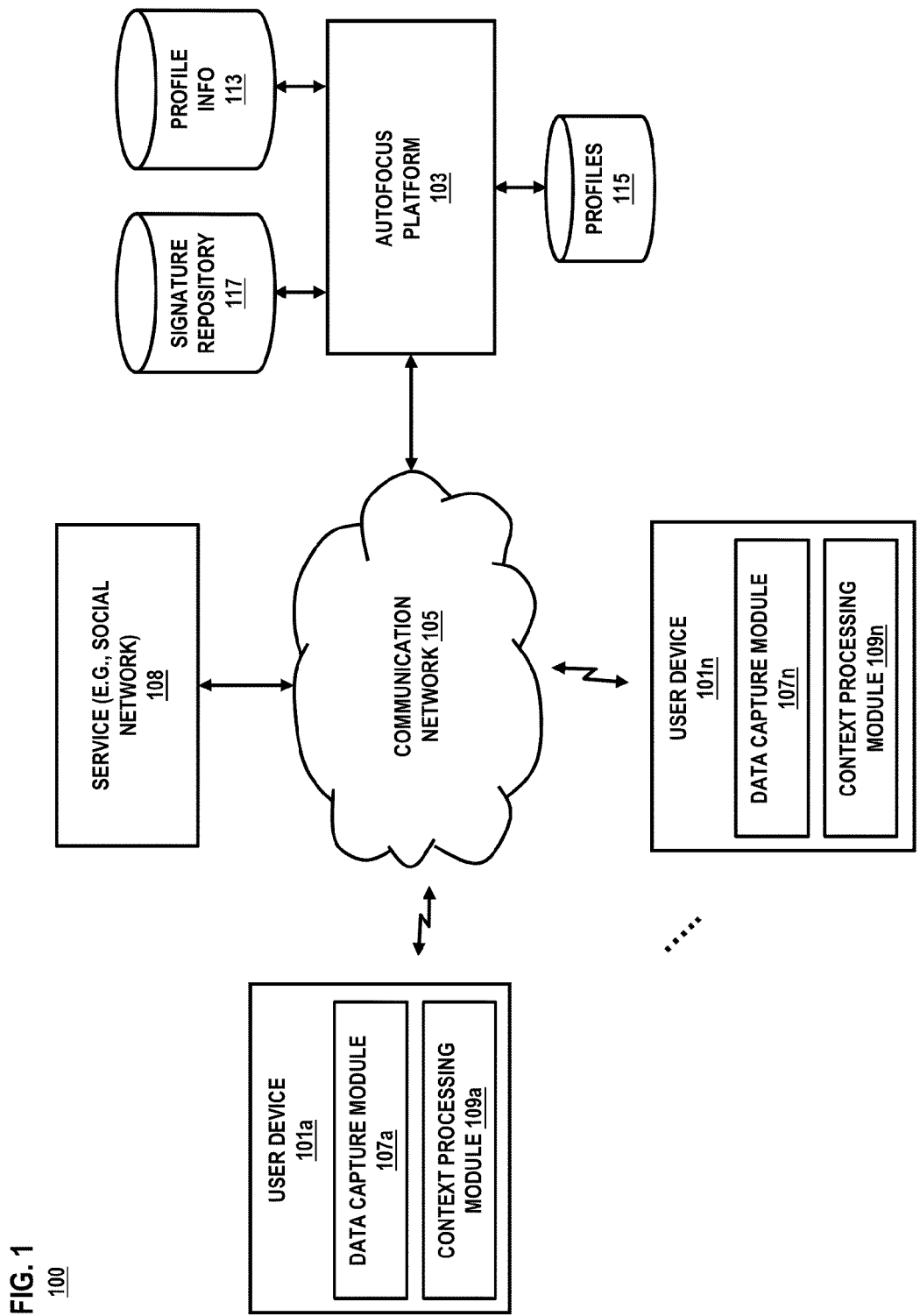
FIG. 1 is a diagram of a system for enabling the autofocus feature of a camera to be directed towards priority targets within a frame, according to one embodiment.

FIG. 1 is a diagram of a system for enabling the autofocus feature of a camera to be directed towards priority targets within a frame, according to one embodiment. For the purposes of explanation, system 100 is shown to include one or more user devices 101a-101n (e.g., camera, smart phone, tablet, netbook, etc.), which are configured to interact with an autofocus platform 103 for performing directed, trained autofocus. The autofocus platform 103 enables a data capture module 107a-107n of the respective devices to target a specific object in a frame of image content. In certain embodiments, the autofocus is directed to focus on: (1) a specific object, i.e., a face of a particular person, based on a determined number one times this object is observed, or (2) a user specified target, where that target is designated by the user as a top priority.

Many cameras, smartphones and other imaging devices have an autofocus feature that enables users to select a specific point in the frame on which to focus for image capture. Typically, the autofocus is configured to utilize facial recognition to target faces as an object type featured in the image frame. For example, when a user of a camera device directs the camera to a scene featuring multiple people, the autofocus targets each face in the scene as the focal point for imaging. However, there are instances where a particular person among the crowd is required to be the primary focal point. Unfortunately, conventional approaches do not provide any way for the user to automatically adapt the autofocus settings so that it may identify and focus on a specific target of interest rather than a rigid object type. Furthermore, these traditional systems provide no means of enabling an autofocus feature to be trained over time to prioritize the targeting of specific objects on the basis of one or more conditions being fulfilled.

To address this issue, system 100 presents an autofocus platform 103 that is configured to direct an autofocus feature of a camera or image capture device for targeting user specified objects. In addition, the autofocus platform 103 provides a user interface for enabling a user to maintain a repository of images and associated priorities of said images. By way of this approach, when object recognition is performed in connection with an autofocus feature of a camera, specific objects in the frame can be identified and associated with a designated priority. The autofocus platform 103 enables a higher priority designation for a given object to be the target for directing the autofocus. Lower or non-priority targets, i.e., those associated with a lower or no priority, are not established as the target in the frame even though they may be of the same object type or classification.

Under this approach, the autofocus platform 103 permits the camera to target specific objects rather than object types in the frame. For example, in the scenario described above of a scene featuring a group of people, a specific face among the group can be designated by the user as the focal point instead of the face of everyone in the group. In certain embodiments, the autofocus platform 103 provides a user interface for enabling the user to establish various autofocus settings, including the establishing of which objects are to be focused upon as well as their particular priority. Also, in this regard, the autofocus platform 103 maintains a signature repository 117 for storing one or more images of objects and labels to be associated with a specific priority designation with respect to a particular user.

For the purpose of illustration, the term "signature" as used in herein pertains to data for enabling the unique identification of objects of interest in the same manner, e.g., fingerprint data (e.g., unique patterns of the finger) or other biometric information (e.g., retina scan) can be correlated with a specific person. In the case of the autofocus platform 103, object identification is enabled on the basis of comparative image data, one or more labels for indicating contextual or descriptive information regarding the object of interest, or a combination thereof. By way of example, a user of device 101*a* as subscribed to the platform 103 can upload images of friends and family to the signature repository 117 via the user interface. In certain instances, the images may be tagged/labeled to include temporal information (e.g., date and time of image capture), location information, or descriptors such as object names, venue types, activity types, etc. Under this approach, an image of, for example, a family dog can be uploaded to the repository 117 in association with a tag specifying the name of the dog as "Cola." Similarly, the user can upload an image of a famous television personality in association with a tag specifying the name of the person or the television program they appear on. It is noted, therefore, that the signature repository 117 stores images and optionally, one or more labels associated with such images, in relation to a particular user (e.g., via user profile information 113). This data may then be used in connection with recognition technology for correlating this data with a particular object determined in view of the camera.

In certain embodiments, the autofocus platform 103 also enables the user to associate a priority with a given image uploaded to the signature repository 117. The priority can be associated directly by the user or on a conditional basis. In the former, the user assigns the priority level to a specific image at their discretion. Hence, if the user is particularly fond of their dog named "Cola," an image of the dog may be assigned a higher priority than an image of a co-worker. Resultantly, when the dog is within view of the camera, the autofocus platform 103 makes the dog the focal point for enabling image capture. Alternatively, the user can specify the priorities to correspond to those established with respect to a social networking service 108 to which they are subscribed. Under this scenario, a profile, ranking, relationship type or other designation may be adopted by the autofocus platform 103 for establishing a prioritization scheme.

In the case of a conditional prioritization, the autofocus platform 103 prioritizes an object for image capture based on a number of times the object is imaged and/or viewed by the camera. Under this scenario, the autofocus platform 103 maintains a record of the number of times an object is imaged. When a predetermined threshold is exceeded, the autofocus platform 103 flags this image and attempts to identify if it is currently associated with any images in the signature repository 117. When the image is present in the repository 117, the corresponding priority can be increased, while lack of the corresponding image in the repository triggers adding of the image to the repository for training purposes. It is noted that the conditional prioritization may override a user designated prioritization so as to account for a frequency of viewing/observation of specific objects or a frequency of actual imaging of specific objects by the camera. For the purpose of illustration, the viewing/observation of objects corresponds to a detecting of one or more objects within a scene prior to actual capture of the image.

In certain embodiments, the autofocus platform 103 may also be configured to upload images that are frequently imaged (captured) by the camera to the signature repository 117. By way of example, when it is detected that a co-worker of a user of an imaging device 101 is frequently imaged, at least one of the images of the co-worker is uploaded. As noted, this may be performed based when a predetermined frequency threshold is exceeded. Also, it is noted that the priority may be automatically associated with the image as uploaded depending on the recorded number of ties the object is imaged as well. This execution corresponds to a training capability, wherein the autofocus platform 103 recognizes object (e.g., faces) over time, enables them to be added to the signature repository for future identification and permits them to be prioritized for autofocus targeting from among a group of other objects within view of an imaging device (e.g., 101). The autofocus mechanism of targets specific objects or hones in on targets that tend to be featured repeatedly.

In certain embodiments, the user interface provided by the autofocus platform 103 also enables establishing of different autofocus mode settings, wherein a different mode corresponds to a different set of priorities. By way of example, when the user is visiting a friend's home, an autofocus mode for indicating the friend as the highest priority may be chosen. This mode can be named by the user as "Best Friend Mode" for easy selection from the interface. Moreover, when the user is at work, an autofocus mode for indicating their boss as the highest priority target is chosen. This mode may be named by the user as "Work Mode" for easy selection from the interface.

It is noted, in certain embodiments, that the user may identify one or more images and therefore, one or more respective priority associations for defining a particular mode. For example, the above described "Best Friend Mode" may feature a priority list ranking from top to bottom for corresponding to an image of the best friend, the best friend's spouse and their child respectively. Under this scenario, the autofocus platform 103 directs the autofocus such that these specific targets are identified by priority when required by the user regardless of the other objects that may be within view at a given time. The user may then automatically switch to a different autofocus mode when required or on the basis of a determined change in context (e.g., determined location information change). It is noted that establishing of one or more autofocus modes enables the user to establish a theme based prioritization scheme that accounts for different environments and settings of the user. Under this approach, the user does not have to associate a priority with each of the images uploaded to the repository 117 but rather within the bounds of a particular autofocus mode or category.

In certain embodiments, context changes are detected by the autofocus platform 103 on the basis of context information gathered by context processing modules 109*a*-109*n*. For example, a network detection signal of a friend's user device or as transmitted by their routing device may be detected by the context processing module 109 the user's device 101. The autofocus platform 103 uses this information to determine the user is in presence of their friend. Hence, the context processing module 109 conveys context information to the platform 103 in the form of location information, motion information, device usage information, device status information, network information, or a combination thereof. Sensors employed by the context processing module 109 for gathering such data may include a gyroscope, weather sensor, temporal sensor, global positioning sensor, motion detection sensor, or the like.

By way of illustration, when a group of individuals are detected by the camera as part of a scene capable of being imaged, the autofocus platform 103 performs one or more of: (1) receiving a request to perform a directed autofocus, i.e., from a camera device, pursuant to viewing/detection of a scene; (2) compare the objects within the scene with one or more images uploaded by the user per a signature repository 117 to determine a match; (3) determine a priority associated with the objects to be imaged in response to a match; and (4) cause generation of a control signal for directing the autofocus of the camera to the object within the scene that is determined to be associated with the highest priority. In certain embodiments, the comparison is performed based on one or more pattern, object, facial or other image recognition techniques. In addition, the priority is established based on a ranking provided by the user or determined as a result of a frequency of a particular object being identified within a scene. Under this approach, therefore, a user can train the autofocus mechanism of their camera via the platform 103 to target specific objects or to automatically hone in on targets that tend to be featured in various scenes detected or imaged by the camera.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101a-101n can support any type of interface for supporting the presentment or exchanging of data, the capture and storing of data including images, or a combination thereof. For example, the various user devices may 101a-101n may feature a data capture module 107 for supporting the capture of audio, image and video data in connection with one or more applications operable by the device.

In addition, user devices 101a-101n may facilitate various input means for receiving and generating information, including touch screen capability, keyboard and keypad data entry, voice-based input mechanisms and the like. Any known and future implementations of user devices 101 are applicable.

In certain embodiments, user devices 101a-101n, the autofocus platform 103 and other elements of system 100 may be configured to communicate via a communication network 105. According to certain embodiments, the communication network 105 may be any suitable wireline and/or wireless network, and be managed by one or more service providers. In addition, the network 105 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Meanwhile, the network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. Still further, the communication provider network 105 may embody circuit-switched and/or packet-switched networks that include facilities to provide for transport of circuit-switched and/or packet-based communications. It is further contemplated that network 105 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to a service provider network as facilitated via a router.

Figure 2:
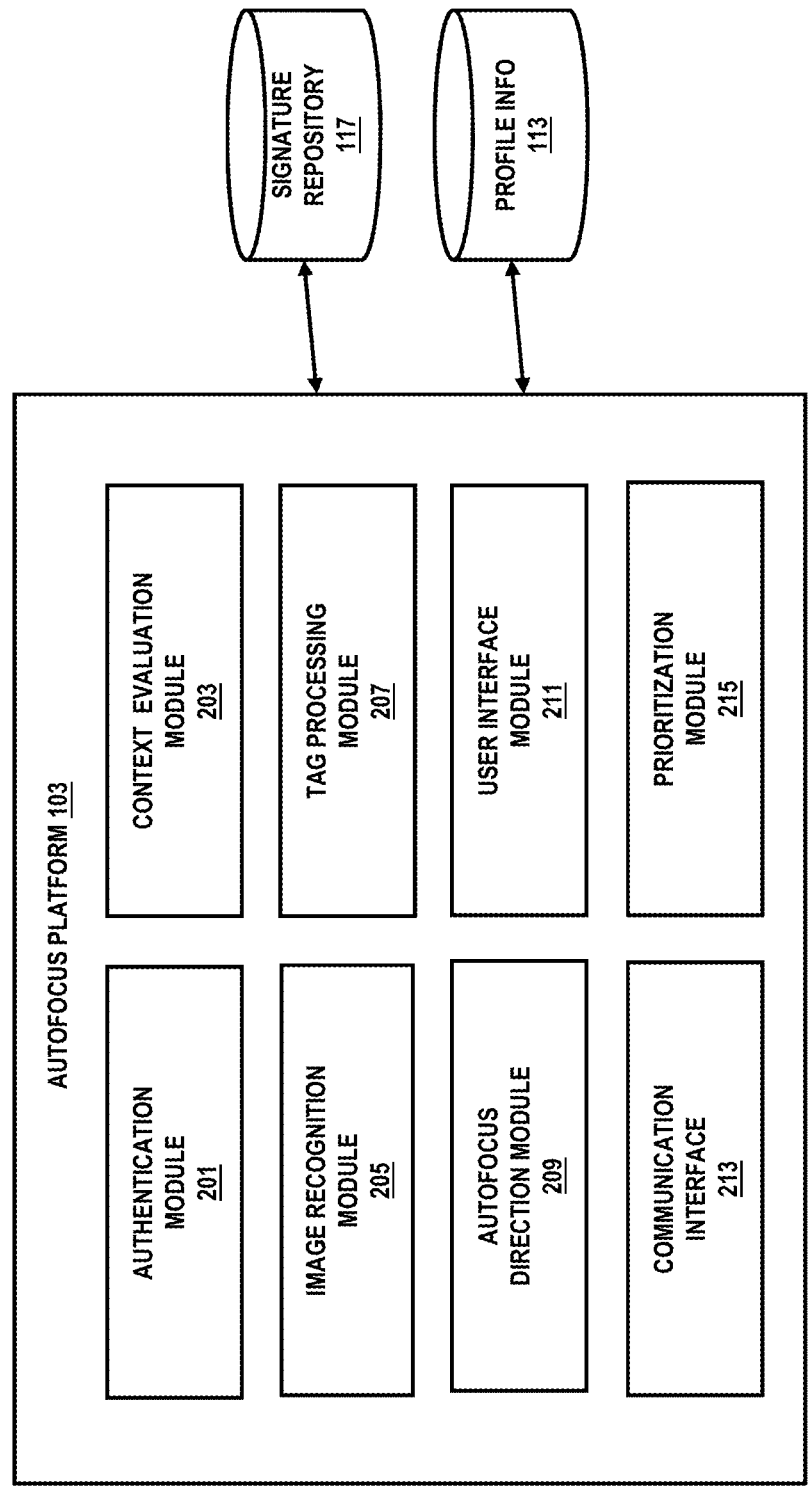
FIG. 2 is a diagram of a autofocus platform, according to one embodiment.

It is also noted that the autofocus platform 103 can be implemented for use over the communication network 105 as a hosted solution or on a subscription basis by a service provider. This may include, for example, the telecommunications service provider that supports execution of user devices capable of performing image capture (e.g., has a data capture module 107). Under this scenario, the signature repository 117 may also be accessed by the camera remotely or can be implemented as a cloud based repository. Alternatively, the autofocus platform 103 can be directly integrated for execution by user devices 101a-101n. Under this scenario, the signature repository 117 is maintained as an internal data source of the user device 101. The exemplary embodiments presented herein pertain to either implementation, as the autofocus platform 103 can be adapted in the form of one or more network or device executable components accordingly. FIG. 2 is a diagram of the various components of the autofocus platform, according to one embodiment.

The autofocus platform 103 includes various executable modules for performing one or more computing, data processing and network based instructions that in combination provide a means of enabling the autofocus feature of a camera to be directed towards priority targets within a frame. Such modules can be implemented in hardware, firmware, software, or a combination thereof. By way of example, the notification service platform 103 may include an authentication module 201, context evaluation module 203, image recognition module 205, tag processing module 207, autofocus direction module 209, user interface module 211, communication interface 213 and prioritization module 215.

In addition, the autofocus platform 103 also accesses image data from a signature repository 117 as well as profile information from a database 113. Various modules 201-215 access these databases 117 and 113 for performing several of their operations.

In one embodiment, an authentication module 201 authenticates users and user devices 101a-101n for interaction with the autofocus service 103. By way of example, the authentication module 201 receives a request to subscribe to the autofocus platform 103. The subscription process may include the establishing of one of more image/object priorities, preferred social networks, etc. Preferences and settings information may be referenced to a specific user, user device, wireless device, or combination thereof, and maintained as profile information 113. It is noted that the user may also establish various autofocus modes accordingly.

The authentication process performed by the module 201 may also include receiving and validating a login name and/or user identification value as provided or established for a particular user during a registration process with the service provider. The login name and/or user identification value may be received as input provided by the user from the user device 101 or other device via a graphical user interface to the platform 103 (e.g., as enabled by user interface module 211). Profile data 217 for respective subscribers, which contain pertinent user or device information, can be cross referenced as part of the login process. Alternatively, the login process may be performed through automated association of profile information 113 maintained as registration data with an IP address, a carrier detection signal of a user device 101, mobile directory number (MDN), subscriber identity module (SIM) (e.g., of a SIM card), radio frequency identifier (RFID) tag or other identifier.

In one embodiment, the context evaluation module 203 analyzes the context information provided by context processing modules 109a-109n of the various devices of the user. This analysis is performed in concurrence with processing of image data as processed by the image recognition module 205, such as to determine a relevant context of the user, the user device, or other user devices at the moment of viewing/imaging a scene. In instances where a device associated with the user is not equipped with a context processing module 109 (e.g., wireless device), the context evaluation module 203 interprets data collected by one or more sensors of the device to generate context information. The data is processed according to the sensor type—i.e., if the sensor is a network detection sensor, it processes and interprets the network data (e.g., internet protocol address information).

Once processed, the context evaluation module 203 further determines the current state, activity or actions of the user, user device, or other user devices (e.g., within proximity of the user device). It is noted that the context evaluation module 203 may operate in connection with the tag processing module 207 for extracting specific metadata or context information regarding an image in view of a user device 101. For example, a label associated with an image featuring a descriptor for indicating a name or for indicating location information may be used to facilitate the lookup of correlating image data via the signature repository 117. In addition, the tag processing module 207 may be configured to correlate one or more tags associated with images already in the repository 117 with a newly detected image that requires tagging and/or prioritization. This corresponds to an instance wherein the prioritization module 215 determines that an image not previously catalogued in the repository 117 is determined to exceed a predetermined threshold of imaging by the device.

In one embodiment, the image recognition module 205 employs one or more recognition techniques for analyzing the images viewed by a user device and performing a comparison against known images in the signature repository 117 for a particular user. The image recognition module may employ one or more pattern, object, facial or other recognition techniques. Also, the image recognition module 205 may employ the use of various models for enabling comparative analysis and matching of an image being viewed by a device for potential capture against an image in the repository 117. A match or identification can be determined to within a predetermined tolerance on the basis of various correlation factors—i.e., image skew, spatial parameters, dimensional factors, color, curvature, etc. When a match is determined, the image recognition module 205 reports this occurrence to the prioritization module 215. When no match is determined, the module 205 reports this occurrence to the user interface module 211, which in turn can render a message to the user for indicating the image is not recognized (optional). In addition, the image recognition module alerts the prioritization module 215 and/or tag processing module 207 to add this image to the signature repository in connection with a label (if applicable and enough context information is known) and/or in connection with a priority (if applicable).

In one embodiment, the prioritization module 215 determines the priority that is associated with the identified image based. For example, the prioritization module 215 retrieves profile information 113 associated with the user and/or user device (e.g., camera) that enabled the request to determine the priority associated with the image. Once determined, the prioritization module 215 alerts the autofocus direction module 209 of the priority.

In one embodiment, the autofocus direction module 209 generates a control signal for affecting operation of the autofocus feature of a camera. The control signal causes the autofocus to be directed towards the object currently viewed by the camera that correlates to the determined prioritized target—i.e., that matches an image in the repository or that is determined a frequently occurring object.

It is noted that the above described modules may operate in tandem to perform various autofocus learning features of the platform 103. For example, as noted previously, a recurrently viewed object as recognized by the image recognition module 205 can be subsequently tagged and prioritized. Once done, the autofocus direction module 209 can be set to automatically enable the camera to hone in on the recurring targets in future instances.

In one embodiment the user interface module 211 enables presentment of a graphical user interface for enabling a user to maintain a repository of images and associated priorities of said images. In addition, enabling the user interface module 211 enables various autofocus settings and modes to be configured in connection with a specific user. By way of example, the user interface module 211 generates the interface in response to application programming interfaces (APIs) or other function calls corresponding to the browser application or web portal application of the user devices 101a-101n. Alternatively, the user interface module 211 renders the interface in connection with a function call of an imaging application operable by the device, such as without a network based connection. In either case, the user interface module enables the display of graphics primitives.

In one embodiment, a communication interface 213 enables formation of a session over a network 105 between the autofocus platform 103 and the context processing module 109 of respective user devices 109. By way of example, the communication interface 213 executes various protocols and data sharing techniques for enabling collaborative execution between a subscriber's user device 101a-101n (e.g., digital camera, mobile device, smartphones, tablet computers) and the autofocus platform 103 over the network 105. It is noted that the communication interface 213 is also configured to support a browser session—i.e., the retrieval of content as referenced by a resource identifier during a specific period of time or usage of the browser. The browser session may support the uploading of images, image tagging, etc.

Figure 7:
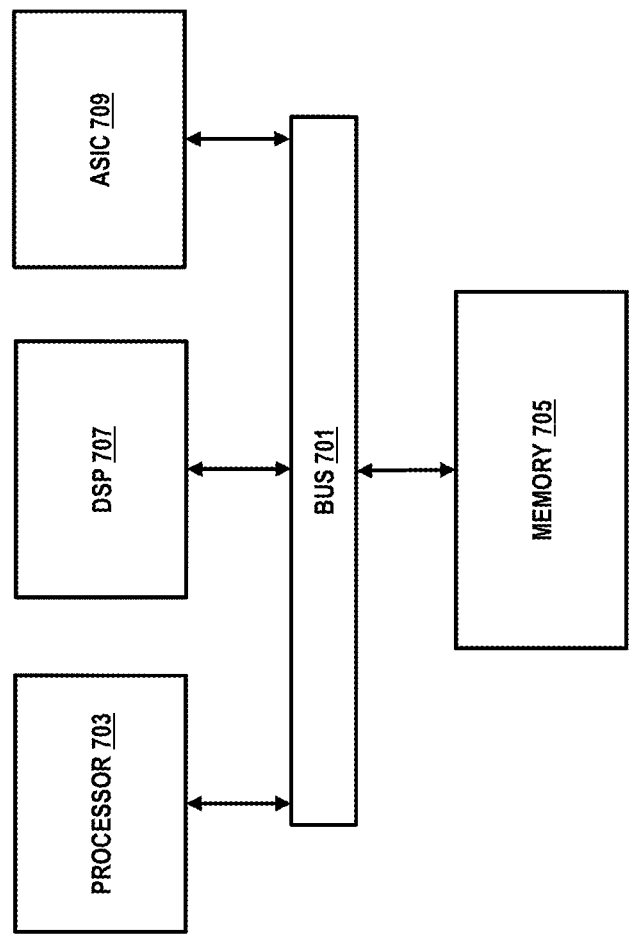
FIG. 7 is a diagram of a chip set that can be used to implement an embodiment of the invention.

FIGS. 3A-3D are flowcharts of a process for enabling a customer to provision resources of a packetized voice service solution provider based on one or more conditions, according to various embodiments. In one embodiment, the autofocus platform 103 performs the process 300 in connection with a camera or image capturing device and is implemented in, for instance, a chip set including a processor and a memory as shown in FIG. 7.

In steps 301 and 303 of process 300, a camera views a scene that includes an object and retrieves a stored object image. The object image is stored in the signature repository. In step 305, process 300 compares the object with the stored object image. As noted previously, this comparison may be performed based on a label associated with the image or one or more object recognition techniques. Per steps 307, process 300 determines a focus point within the scene based on the comparison. In another step 309, process 300 causes the camera to capture the image based on the determined focus point. As noted previously, a control signal may be generated for directing the focal point of the camera to the target object.

In step 311 of process 310 (FIG. 3B), a priority associated with the object image is determined. As noted above, the priority may be specified by the user directly and referenced by profile information associated with the user. In another step 313, process 310 determines a frequency of capture of the object by the camera meets a predetermined threshold. For example, when an object is determined to be imaged more than five times or any other value as set by the user, this may result in an updating or assigning of a priority to the object image based on the determination. In instances where no prior priority is established, a default (lowest) priority may be established. When the frequency is above the threshold by a predetermined extent, a top priority may be established for the object image.

In step 315, process 310 determines an object image, relationship type, ranking, or a combination thereof associated with a social networking profile of the user of the camera. By way of example, the user may specify one or more permissions or settings for enabling the autofocus platform to retrieve object images, names and other information regarding friends they interact with via the social networking service. In certain embodiments, process 310 retrieves this information and populates the signature repository with object images as retrieved. In addition, process 310 can generate labels based on the profile information retrieved via the social networking service. It is noted that the autofocus platform 103 translates the relationship type, ranking information and other data into a priority associate with the user. For example, a person that interacts with the user via the social networking site that is categorized/labeled as "Best Friend" is assigned a higher priority than a person categorized/labeled as "Associate." Per step 317, process 310 updates or assigns a priority to the object image based on the determination.

Process 318 of FIG. 3C correspond to the training and learning capabilities of the autofocus platform 103 as it operates in connection with a camera. In step 319, the camera captures an image that includes an object. In another step 321, a label and context information related to the camera, the user or other devices is associated with the object. Per step 323, the image of the object is stored as it is determined not to match any known object image. Hence, as noted above, the autofocus platform 103 persistently stores several of the objects captured for populating the signature repository in association with the user.

It is contemplated, in future embodiments, that the signature repository can be leveraged by the user for generating collections of images based on priority. For example, the user may generate a collection of only those images that feature priority targets while excluding all other images. As another example, the user may opt that only images featuring a first and second priority target object in the scene be synchronized with another device or downloaded to a home computer. Also, it is contemplated that the autofocus platform 103 be configured to share collections of images of a given person as taken by the camera with the person via their social networking profile automatically. Under this scenario, the person imaged based on priority can retrieve and view those images that correspond to them only rather than having to sift through all images shared by the user.

In step 325 of process 324 (FIG. 3D), a determination is made whether a condition associated with the camera, a user of the camera, the object, or a combination thereof is met. By way of example, the condition may be a location condition, activity condition, temporal condition or other contextual condition. As noted previously, context information may be accounted for by the platform 103 for perceiving the present environment or settings of the user or objects on the scene. When a change is detected, a predetermined autofocus mode for specifying one or more priorities in association with specific object images may be activated. This corresponds to step 327, wherein the autofocus platform 103 determines a focal point within a scene based on the determined contextual condition (change) being met.

FIGS. 4A-4B and 5A-5E are diagrams of a user interface for enabling the autofocus feature of a camera to be directed towards priority targets within a frame, according to one embodiment. For the purpose of illustration, the diagrams are described from the perspective of a user case of a user of a tablet device 400 that is capable of capturing and rendering images. The tablet device is configured to operate in connection with the autofocus platform 103 for enabling directed focusing of the camera upon objects, including people, symbols, etc., on a priority basis.

Figure 4A:
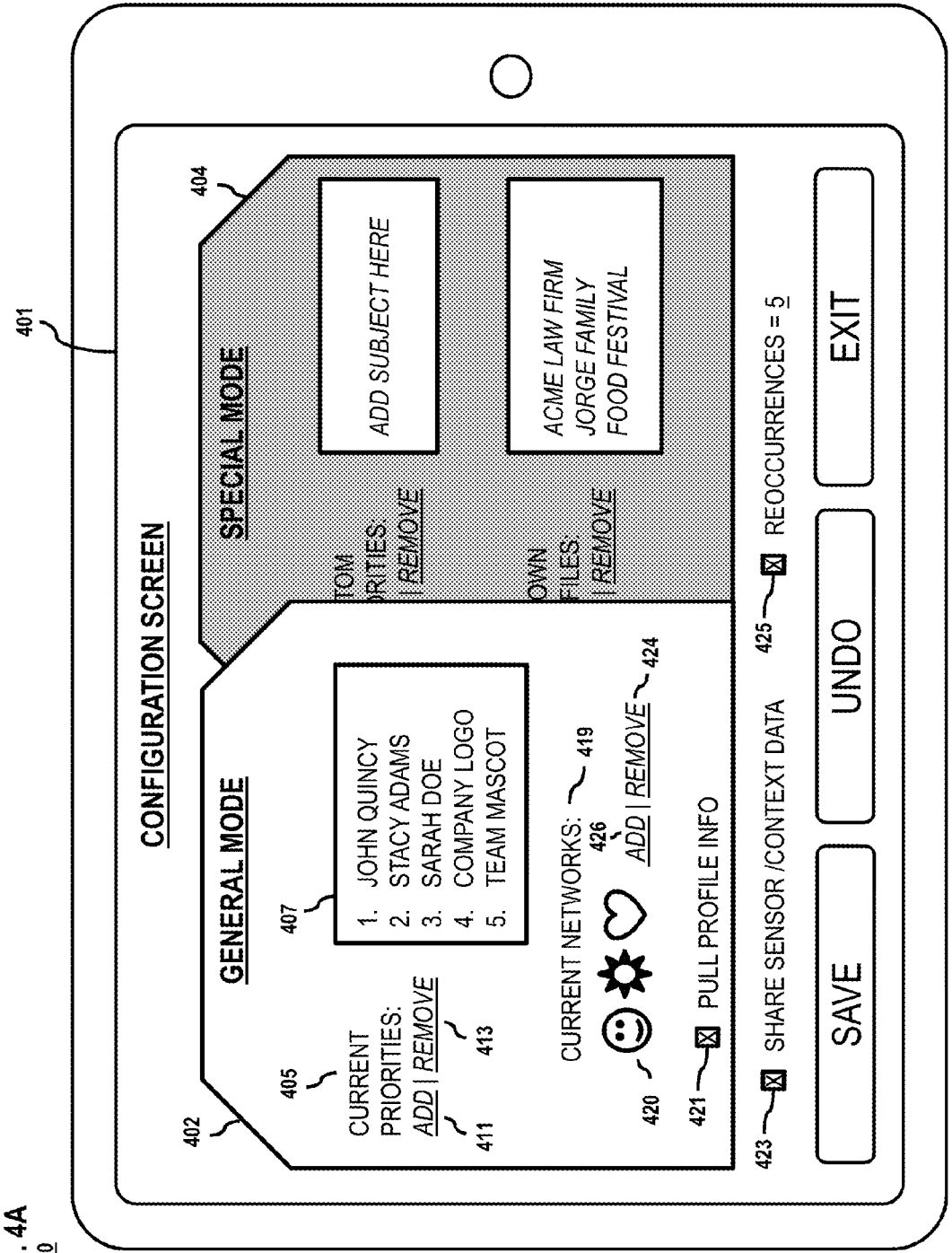
Figure 4B:
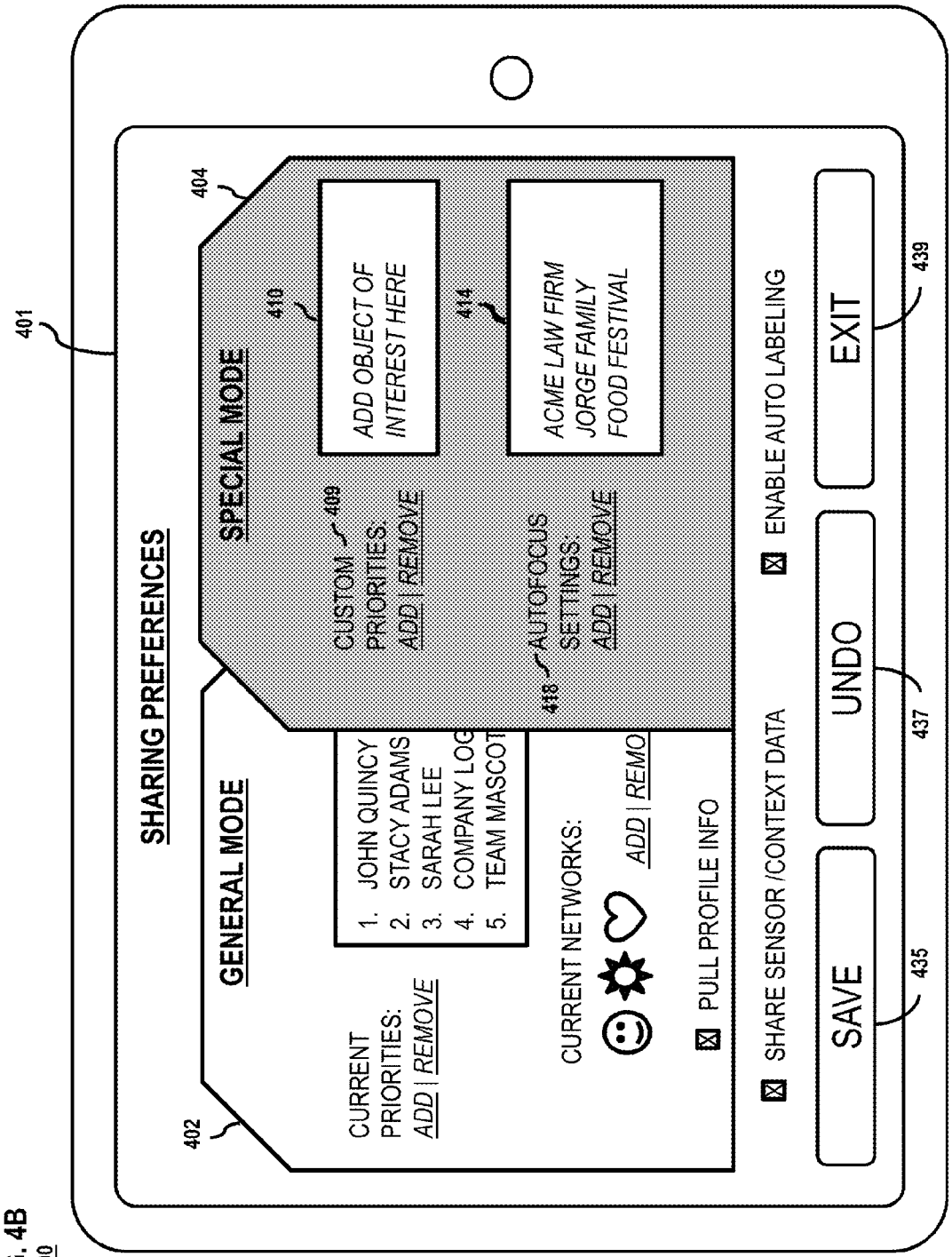

In FIGS. 4A and 4B, a configuration interface is presented to the display 401 of the device. By way of example, the configuration interface presents various buttons, menus and selection options for the user to invoke for establishing their prioritization settings, network settings, autofocus mode of operation, etc. A first tab 402 may be selected by the user to enable one or more general mode settings to be established. General mode 402 corresponds to the standard operation of the autofocus platform 103 with respect to the device 400 while special mode 404 corresponds to a customized/user designated prioritization mode, including a paparazzi mode, autofocus mode, etc. It is noted that the special mode enables the autofocus platform 103 to override any standard settings established via general mode 402 when activated.

The general mode settings include current priority settings 405 for adding or removing of objects to a prioritization scheme list 407. The user can select the ADD or REMOVE links 411 and 413 respectively to add or remove entries from the list 407. In this scenario, the user has included the designation of five targets objects in order of priority. The target objects correspond to the names of specific people, a symbol for representing a company logo and a character for a sports team. Upon selecting the ADD link 411, an additional window may be presented for enabling the user to upload an object image corresponding to each entry in the list 407.

Current network settings 419 are also presented for enabling a user to add or remove (via ADD and REMOVE links 426 and 424) networks the user is subscribed to. Various icons, i.e., 420, are presented for representing the established networks. The user may also select a checkbox 421 for enabling the pulling of profile information, including image objects and relationship type information from the designated networks 420. It is noted that the information pulled from the networks correspond to the entries in the list 407.

The user may also select a checkbox 423 and 425 for activating or deactivating the sharing of context information or recurrence settings. In the former, activation of the checkbox 423 enables the device to directly share context information with the autofocus platform, such as via a context processing module. In the latter, activation of the checkbox 425 enables the user to indicate the number of times an object may be imaged before being assigned a priority or added to the repository. In some instances, the value established may correspond to a predetermined threshold to be met for designating the object as being a priority target.

FIG. 4B shows the general mode settings tab 404, which includes custom priority settings 409 for enabling a user to add or remove specific objects of interest to a priority list 410. This corresponds to a user designated priority as opposed to conditional (e.g., based on a number of reoccurrences of an object). By way of example, the user may specify that a particular singer be the focal point when the camera 400 is used to capture a scene of a performance. Also, one or more autofocus mode settings 418 may be selected and/or established for enabling execution of the autofocus for accommodating different environments. In this example, three different autofocus modes are listed 414, each corresponding to a different list of associated objects to focus on based on priority. For example, the ACME Law Firm may include a priority list for indicating the Senior Partner of the firm is the highest priority target. Additional members of the firm may or may not also be indicated.

Once the user establishes their settings, they can select a SAVE action button 435 to save the configuration settings or can undo them by selecting the UNDO action button 437. To exit the configuration interface, the user can select the EXIT action button 439

Figure 5E:
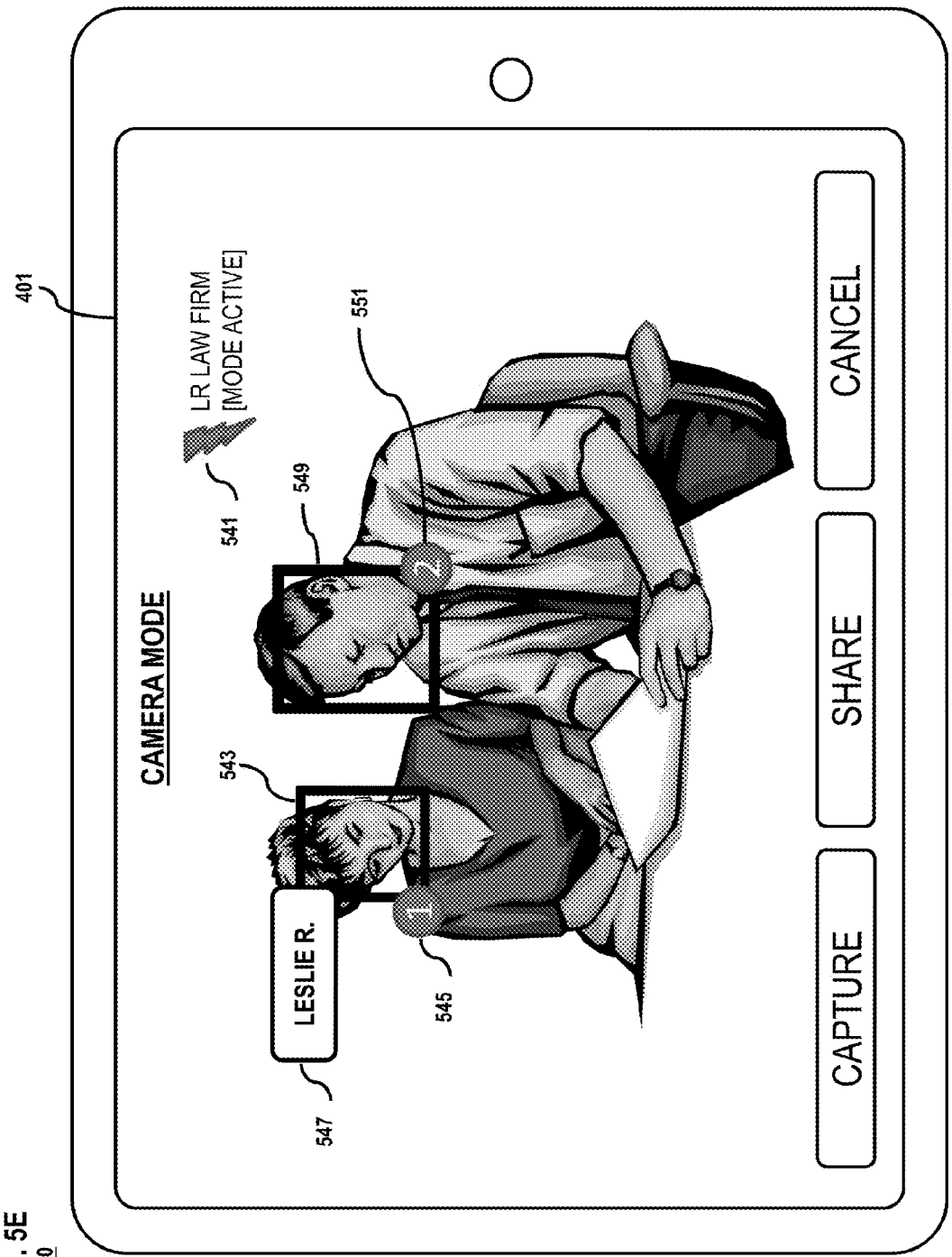

FIGS. 5A-5E present various executions of the device 400 autofocus as a result of one or more of the configuration settings of FIGS. 4A and 4B. In FIG. 5A, a scene is presented to the display 401 of the device 400 that includes multiple people, including a face (e.g., object) designated as or corresponding to "John Quincy." As shown in the priority list 407, this represents a priority target. Thus, once the object 507 as viewed is matched with an image of the object, an autofocus indicator 503 is presented around the object for indicating this object 507 as the focal point for the image. In addition, a priority indicator 509 and corresponding label 505 for the target are shown. The user can select the CAPTURE, SHARE and CANCEL action buttons 511, 513 and 515 respectively in order to capture the image, share the captured image with others, or cancel the image capture operation altogether.

In FIG. 5B, another scene is viewed by the device 400. In this scene, the camera 400 determines an object corresponding to the image of a company logo 513 (Jazzy's Catering) has shown up over five times—i.e., in excess of the reoccurrence setting 425. As a result of the reoccurrence setting 425, a message 517 is presented to the user for determining if the user wants to add an image of this recurring object to the repository, update a current priority associated with the logo, or cancel. Under this scenario, the autofocus indicator 503 also features a status indicator 514 with a question mark for indicating this particular object has no comparative image information in the repository. Hence, the user can add the image by selecting the ADD action button 519, update a current priority of the object 513 by selecting the UPDATE action button 521 or cancel viewing of the scene by selecting the CANCEL action button 523. The user can also respond by cancelling the message via a cancel button 517, which indicates that the general mode of operation corresponding to FIG. 5A is to be resumed.

For the purpose of illustration, when the logo 513 corresponds to the one featured in the list 407 as fourth priority 4 and the primary target (John Quincy) is not in the scene, the autofocus indicator 503 is presented around the logo 513. Also, while not shown, the autofocus status indicator 514 may also be caused to present the number '4' for indicating the priority setting in the list 407.

In FIG. 5C, another scene is viewed by the device 400. In this scene, the camera 400 is in special mode where it is instructed to identify a custom priority per a setting 409. The priority object in this case is the face of a singer named Fernando of a popular Mariachi band. An image of the singer along with corresponding tag/label information is maintained in the signature repository. As a result, the autofocus platform 103 causes the autofocus indicator 523 to be placed around the object 521 in the scene that substantially matches the image on file. In addition, a priority status indicator 525 and corresponding label 527 are shown. It is noted that this corresponds to a user designated priority mode of operation.

It is contemplated in certain embodiments as well that a paparazzi mode may be established for prioritizing certain high profile targets (e.g., movie stars, sports figures, etc.). This mode of operation may be coordinated based on direct user designation or on the basis of social networking profile information. For example, if the user is a big fan of Fernando as indicated via their social networking profile, a higher ranking will be automatically assigned to sensor/image data indicating this object 521 is in view.

In FIGS. 5D and 5E, another scene is viewed by the device 400. In this scene, the camera 400 operates in autofocus mode, wherein device context information is processed to determine the user is at a location of one of their clients. This corresponds to the autofocus mode of ACME Law Firm, as indicated in the list 414. In this example, location information is determined to correspond to the location of the client. In addition, various objects in the scene are recognized as matching data in the signature repository, including the face 541 of the owner of the firm. Based on the determined context, a particular autofocus mode is recommended by the autofocus platform 103 via a message 523. The user can select the YES or NO action buttons 527 and 529 respectively to confirm/activate the suggested autofocus mode or decline activation and maintain general mode settings.

Upon selection of the YES action button 527, the ACME Law Firm autofocus setting/mode is activated. Resultantly, an indicator is presented to the display 401 to specify that the mode is active. In addition, the autofocus indicator 543 is automatically placed around the face of the senior partner of the firm, which is determined as the priority target based on image data within the repository. The priority status indicator 543 and label 547 is also shown.

It is contemplated that the autofocus indicator, i.e., 543, can also be placed around mutually designated targets within view of a scene. For example, if it is determined the face of the other person in the scene is that of another priority target, an autofocus indicator 549 is also placed around this object. In certain embodiments, the priority status indicator 551 associated with the object may reflect the relative priority of the object per the automode settings. It is noted that the priority status in this case is "2," which is presented to the user accordingly while maintaining the other object as the focal point. It is noted that any designation or indicia for representing relative priorities may be used. Alternatively, the user could designate that both of the objects are top priority—i.e., the status indicators 545 and 551 both indicate priority level 1.

The exemplary techniques and systems presented herein enable the autofocus feature of a camera to be directed towards priority targets within a frame. The autofocus platform interacts with a device, such as a camera, to enable directed, trained autofocus based on priority. In addition, the autofocus platform adapts the priority based on a determined contextual condition being met.

The arrangements and processes explained above, according to certain embodiments, enhance the user experience in capturing images, whereby opportunities to capture an event is optimized to provide a desired composition for the images.

For example, if the event will not recur, the photo opportunity will be wasted on poor images if the subject is not captured properly.

The processes described herein for enabling the autofocus feature of a camera to be directed towards priority targets within a frame may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
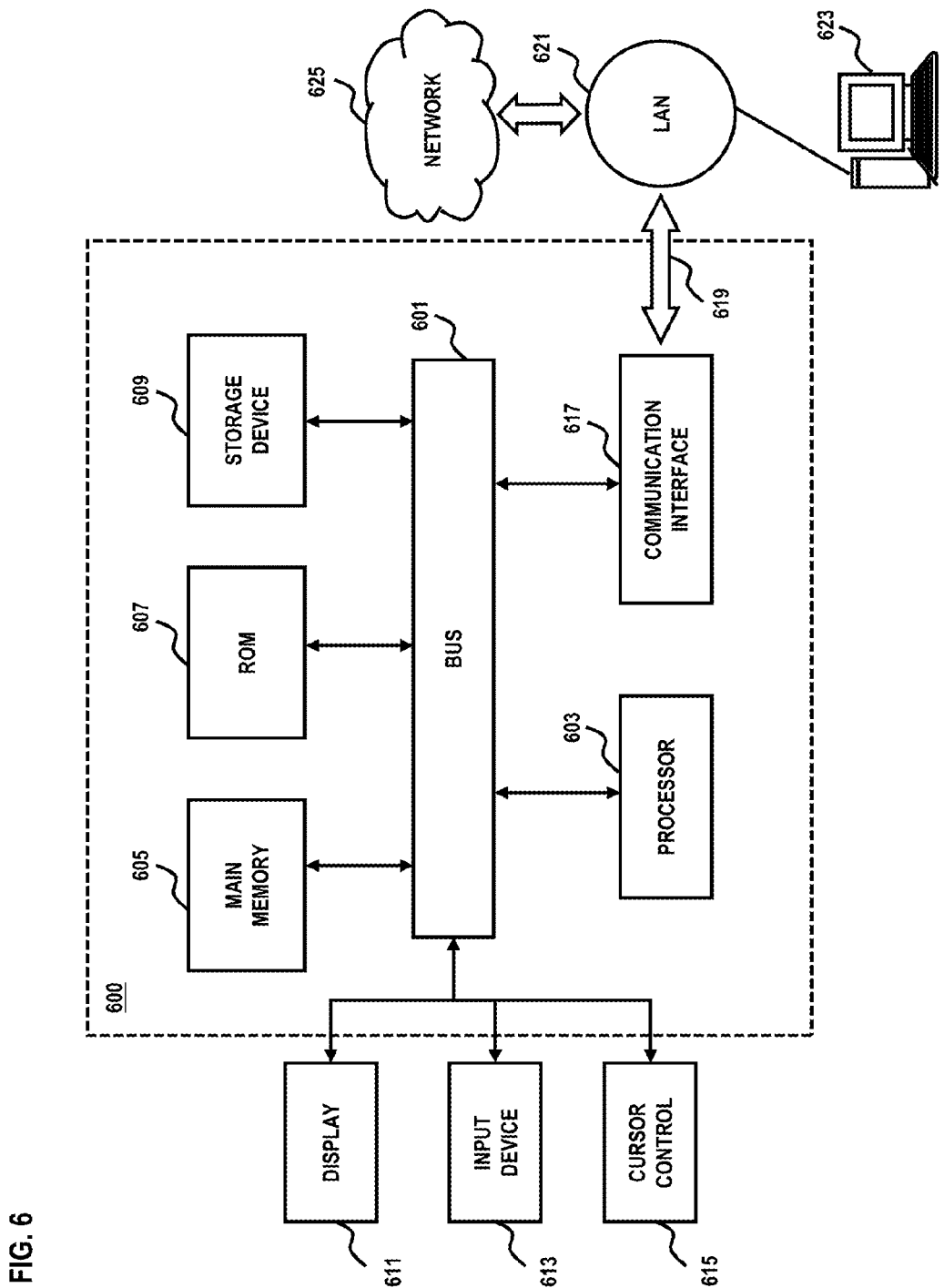
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to enable the autofocus feature of a camera to be directed towards priority targets within a frame as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling the autofocus feature of a camera to be directed towards priority targets within a frame.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable the autofocus feature of a camera to be directed towards priority targets within a frame. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    viewing, by a camera, a scene that includes a plurality of objects;
    retrieving, by the camera, a stored object image, relationship type, and ranking associated with a social networking profile of a user of the camera, wherein the stored object image, relationship type, and ranking are retrieved over a communication network as part of a subscription service;
    comparing the plurality of objects in the scene with the stored object image for a match;
    identifying a specific object from among the plurality of objects as a match with the stored object image;
    determining, in response to the match, a priority associated with the specific object based on the relationship type and ranking;
    determining a focus point on the specific object within the scene based on the comparing of the object in the scene with the stored object image;
    focusing the camera on the focus point based on the specific object being identified as a priority target object; and
    capturing, by the camera, an image of the specific object using the determined focus point.

2. A method of claim 1, wherein the priority is based on the ranking assigned to the stored object image by the user of the camera, and the focusing of the camera is based on the priority.

3. A method of claim 1, further comprising:
    determining if a frequency of imaging and/or viewing of the specific object by the camera meets a predetermined threshold, the imaging and/or viewing of the specific object corresponding to a detecting of the specific object within a scene prior to the capturing of the image of the specific object;
    uploading an object image of the specific object to a signature repository based on the determination of the frequency; and
    updating the priority associated with the specific object based on the determination.

4. A method of claim 1, further comprising:
    storing the image of the specific object,
    wherein the image is determined not to match a stored object image.

5. A method of claim 4, further comprising:
associating a label, context information, or a combination thereof with the image of the specific object,
wherein the label, the context information, or a combination thereof is associated with the camera, a user of the camera, the specific object, or a combination thereof, and the label, the context information, or a combination thereof is stored with the image of the specific object in association with the social networking profile of the user of the camera.

6. A method of claim 1, further comprising:
establishing a plurality of autofocus modes, wherein at least one of the plurality of autofocus modes is a theme based prioritization structure that accounts for different environments and settings of a user of the camera;
determining if a condition associated with the camera, a user of the camera, the specific object, or a combination thereof is met;
updating the priority associated with the specific object based on the condition; and
determining a focus point within a scene based on the determination of the priority.

7. A method of claim 6, further comprising:
detecting a change of context information associated with the camera,
wherein the context information is based on location information, motion information, device usage information, device status information, network information, or a combination thereof, and
wherein the condition is based on a location of the user, a location of the specific object, an activity associated with the scene, a time associated with the scene, or a combination thereof.

8. A method of claim 1, wherein the stored object image is retrieved by the camera from a remote repository maintained by the user, and the camera is a standalone device or is integrated with a mobile device.

9. A method of claim 1, wherein the object is a face, a symbol, a specified item, a keyword, or a combination thereof.

10. An apparatus comprising:
at least one processor; and
at least one memory including computer program code for one or more programs,
the at least one memory and the computer program code configured to, with the at least one processor, cause the apparatus to perform at least the following,
view, by a camera, a scene that includes a plurality of objects;
retrieve, by the camera, a stored object image, relationship type, and ranking associated with a social networking profile of a user of the camera, wherein the stored object image, relationship type and ranking are retrieved over a communication network as part of a subscription service;
compare the plurality of objects in the scene with the stored object image for a match;
identify a specific object from among the plurality of objects as a match with the stored object image;
determine, in response to the match, a priority associated with the specific object based on the relationship type and ranking;
determine a focus point on the specific object within the scene based on the comparison of the object in the scene with the stored object image;
focus the camera on the focus point based on the specific object being identified as a priority target object; and
capture, by the camera, an image of the specific object identified using the determined focus point.

11. An apparatus of claim 10, wherein the priority associated with the specific object is higher than one or more other priorities associated with the one or more other objects.

12. An apparatus of claim 10, wherein the apparatus is further caused to:
determine if a frequency of imaging and/or viewing of the specific object by the camera meets a predetermined threshold, the imaging and/or viewing of the specific object corresponding to a detecting of the specific object within a scene prior to the capturing of the image of the specific object;
upload an object image of the specific object to a signature repository based on the determination of the frequency; and
update the priority associated with the specific object based on the determination.

13. An apparatus of claim 10, wherein the apparatus is further caused to:
store the image of the specific object,
wherein the image is determined not to match a stored object image.

14. An apparatus of claim 13, wherein the apparatus is further caused to:
associate context information with the image of the specific object,
wherein the context information is associated with the camera, a user of the camera, the object, or a combination thereof, and wherein the context information is based on location information, motion information, camera usage information, camera status information, network information, or a combination thereof.

15. An apparatus of claim 10, wherein the apparatus is further caused to:
determine if a condition associated with the camera, a user of the camera, the object, or a combination thereof is met;
update the priority associated with the specific object based on the condition; and
determine a focus point within a scene based on the determination of the priority.

16. An apparatus of claim 15, wherein the condition is based on a location of the user, a location of the object, an activity associated with the scene, a time associated with the scene, or a combination thereof.

17. An apparatus of claim 10, wherein the stored object image is retrieved by the camera from a remote repository maintained by the user, and the camera is a standalone device or is integrated with a mobile device.

18. An apparatus of claim 10, wherein the object is a face, a symbol, a specified item, a keyword, or a combination thereof.

* * * * *